Dec. 14, 1965 S. PETER 3,223,156
METHOD FOR THE PREVENTION OF SULFUR DEPOSIT IN THE RISER
PIPES IN THE EXTRACTION OF NATURAL GASES LADEN WITH
HYDROGEN SULFIDE WHEN ELEMENTARY SULFUR IS
PRESENT IN THE DEPOSIT
Filed April 3, 1963

INVENTOR
Siegfried Peter
BY
Michael S. Striker
ATTORNEY

United States Patent Office 3,223,156
Patented Dec. 14, 1965

3,223,156
METHOD FOR THE PREVENTION OF SULFUR DEPOSIT IN THE RISER PIPES IN THE EXTRACTION OF NATURAL GASES LADEN WITH HYDROGEN SULFIDE WHEN ELEMENTARY SULFUR IS PRESENT IN THE DEPOSIT
Siegfried Peter, Hannover-Buchholz, Germany, assignor to Gewerkschaft Elwerath, Hannover, Germany
Filed Apr. 3, 1963, Ser. No. 270,190
Claims priority, application Germany, Apr. 6, 1962, G 34,656
3 Claims. (Cl. 166—6)

In deposits of natural gas containing a high percentage of hydrogen sulfide large quantities of elementary sulfur are frequently encountered. Gases with a high $H_2S$ content allow considerable quantities of elementary sulfur to be dissolved at increased pressures (several 100 atmospheres) and temperatures, which fact is confirmed by the investigations of Kennedy and Wieland (H. T. Kennedy and D. R. Wieland, Petr. Trans. AIME 219, 166 (1960)). As the temperature decreases the solubility of the sulfur also decreases very rapidly in the gas phase under high pressure. A reduction in pressure likewise causes a considerable reduction in the solubility of sulfur.

When the gas is being extracted or produced it passes as it rises through colder strata and cools down. The dissolved sulfur is precipitated in proportion to the reduction in solubility due to the cooling and deposits on the pipe walls and may result in stoppages. The sulfur deposits particularly firmly on pipe walls when it is precipitated at temperatures in the neighbourhood of its melting point. On the other hand, if the sulfur separates out at temperatures which are below its melting point it only adheres very loosely to the pipe wall and can be carried along by the gas current.

The sulfur precipitated at low temperatures crystallizes and adheres only very slightly to the pipe walls, whereas the sulfur which precipitates at temperatures near its melting point, due to its content of $S_\mu$ (i.e. polymeric sulfur which is insoluble in organic solvents) and possibly also liquid components, sticks on the pipe walls. At low temperatures the precipitating sulfur contains practically no $S_\mu$ and no liquid components. It deposits as $S_\lambda$ (i.e. crystalline sulfur which is soluble in organic solvents) in solid state.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Now according to the method of the present invention the temperature at which the sulfur condenses is reduced to a sufficiently low degree by adding to the gas current at a suitable depth, for example at the head of the deposit, gas which also has a dissolving power for sulfur but is not saturated therewith. The gas being extracted or produced is preferably used for this purpose after the greater part of the sulfur dissolved in it has been removed in a separator above ground. A portion of the gas leaving the separator practically free from sulfur is forced back into the well with the aid of a compressor and fed either through the annular space between the producer pipe string and the casing or through a separate pipe string to the rising gas current, for example at the head of the gas deposit. The gas leaving the separator can also be fed to the head of the deposit in an annular space between the producer pipes and a protecting string to be fitted specially. The quantity of gas circulated in the manner described is so chosen that the point of precipitation for the sulfur in the rising current is below the melting point of the sulfur and the sulfur precipitates out as $S_\lambda$ in solid state.

Figure 1:
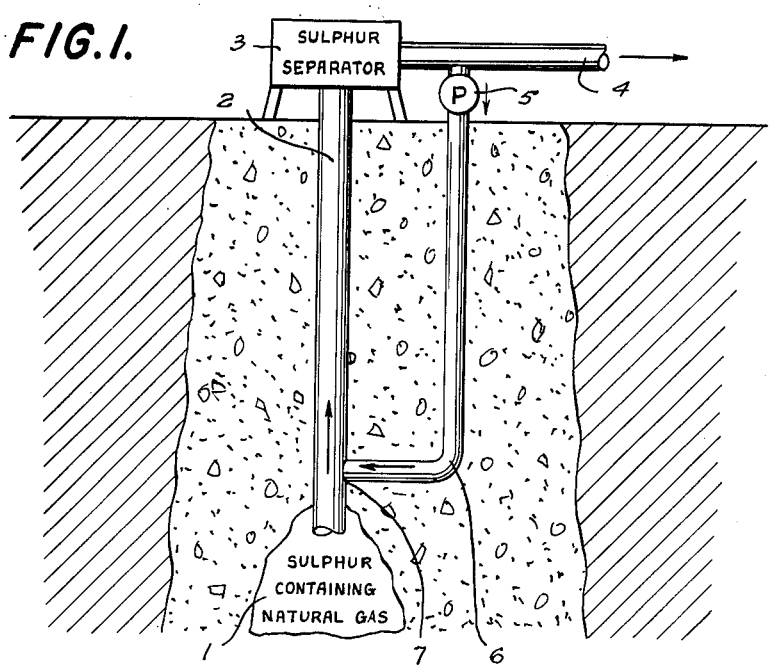
FIG. 1 is a schematic illustration of the process of the present invention.

Referring now to the drawing, and particularly to FIG. 1, it will be seen that sulphur containing natural gas is withdrawn from the head of the deposit 1 through pipe 2 to reach, above ground, sulphur separator 3. The gas is freed in sulphur separator 3 from at least the greater part of the sulphur carried by the same, and the thus purified gas is conveyed through pipe 4 for further processing or introduction into a distribution system. However, a portion of the substantially sulphur-free gas passing through pipe 4 is branched off and returned to pipe 2 by means of pipe 6 and compressor 5. Pipe 6 serves for introducing this branched off portion of substantially sulphur-free gas or gas of low sulphur content into the rising gas stream within pipe 2. In accordance with the illustrated embodiment, pipe 6 communicates with pipe 2 at a point 7 located slightly above the head of the deposit. However, it is also possible to feed the substantially sulphur-free gas, or gas of low sulphur content into pipe 2 at the head of the deposit as described further above.

Example

Figure 2:
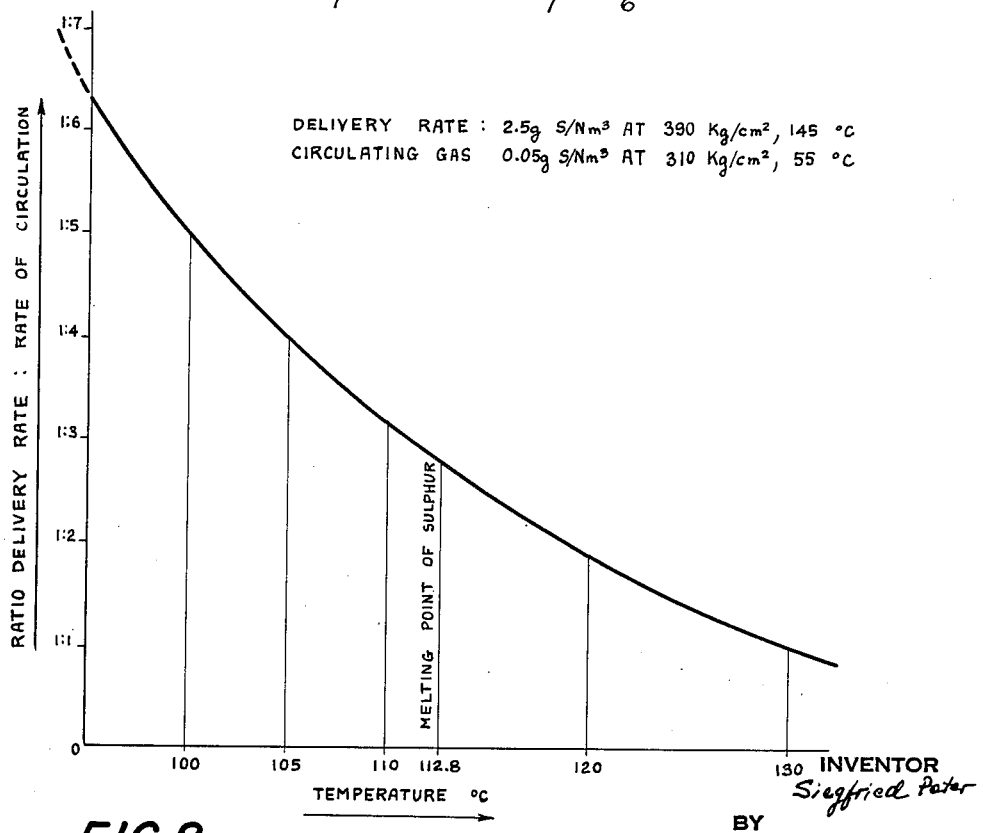
FIG. 2 is a graphic representation of the precipitation temperatures of sulfur as function of the relation between the rate of delivery and the rate of circulation which are obtained under the conditions described further below.

At a depth of about 3,000 metres there is a gas with a composition of 13 vol. percent $H_2S$, 10 vol. percent $CO_2$, 5 vol. percent nitrogen and 72 vol. percent methane, under a pressure of about 390 atmospheres and at a temperature of 145° C. The deposit contains so much elementary sulfur that the gas is saturated with sulfur. According to the investigations of Kennedy and Wieland, a gas of the above composition is capable under the conditions given of dissolving 2.5 g. of sulfur per cubic metre. At a delivery rate of 100,000 Nm.³ (the symbol Nm.³ is to denote "Standard Cubic Meter") per day, a temperature of about 55° C. and a pressure of about 310 atmospheres prevail in the high pressure separator above ground. Under these conditions the gas which leaves the separator still contains 0.05 g. of sulfur in solution per Nm.³. The gas leaving the separator with a pressure of 310 atm. is compressed to about 350 atm. and conducted to the head of the gas deposit through the annular space between the 2⅞" producer pipes and the 5" protecting string. The precipitation temperatures of the sulfur are given in FIG. 2 as a function of the relation between the rate of delivery and the rate of circulation which are obtained under these conditions. (This drawing shows the saturation temperature of sulfur in the "Barenburger" natural gas according to Kennedy and Wieland depending on the circulation rate for a pressure of 360 kg./cm.².) Already with a ratio of 1:4 between the delivery rate and the rate of circulation the precipitation temperature of the sulfur is lower than its melting temperature. A ratio of 1:5 reduces the temperature of precipitation to such an extent that the presence of liquid components or of $S_\mu$ in the precipitated sulfur need no longer be taken into consideration.

What is claimed is:
1. Method of preventing the formation of deposits of polymeric sulfur in riser pipes of natural gas borings which deliver gases from deposits containing elementary sulfur to the upper ends of said pipes, the temperature of the gases in the vicinity of the head of said deposits being higher than the melting temperature of sulfur and the temperature of the gases when the same reach the upper ends of said pipes being below the melting point of sulfur, which gases contain elementary sulfur dissolved therein in such a concentration that the temperature at which said dissolved sulfur would precipitate from the gases upon cooling would be higher than the melting point of sulfur, the temperature of the gases at which the same reach the upper ends of said pipes being less than said melting point, comprising the step of introducing into the rising gases, at a point where said sulfur is still in solution; a gas capable of dissolving sulfur, but unsaturated with sulfur, in such a quantity that the temperature at which the sulfur will precipitate is reduced to below the melting temperature of sulfur and above said temperature at which said gases reach the upper ends of said pipes, so that only crystalline sulfur will precipitate from the rising gases.

2. Method of preventing the formation of deposits of polymeric sulfur in riser pipes of natural gas borings which deliver gases from deposits containing elementary sulfur to the upper ends of said pipes, the temperature of the gases in the vicinity of the head of said deposits being higher than the melting temperature of sulfur and the temperature of the gases when the same reach the upper ends of said pipes being below the melting point of sulfur, which gases contain elementary sulfur dissolved therein in such a concentration that the temperature at which said dissolved sulfur would precipitate from the gases upon cooling would be higher than the melting point of sulfur, the temperature of the gases at which the same reach the upper ends of said pipes being less than said melting point, comprising the step of introducing into the rising gases at the head of the deposit where said sulfur is still in solution, a gas capable of dissolving sulfur, but unsaturated with sulfur; in such a quantity that the temperature at which the sulfur will precipitate is reduced to below the melting temperature of sulfur and above said temperature at which said gases reach the upper ends of said pipes, so that only crystalline sulfur will precipitate from the rising gases.

3. Method of preventing the formation of deposits of polymeric sulfur in riser pipes of natural gas borings which deliver gases from deposits containing elementary sulfur to the upper ends of said pipes, the temperature of the gases in the vicinity of the head of said deposits being higher than the melting temperature of sulfur and the temperature of the gases when the same reach the upper ends of said pipes being below the melting point of sulfur, which gases contain elementary sulfur dissolved therein in such a concentration that the temperature at which said dissolved sulfur would precipitate from the gases upon cooling would be higher than the melting point of sulfur, the temperature of the gases at which the same reach the upper ends of said pipes being less than said melting point, comprising the steps of introducing into the rising gases, at a point where said sulfur is still in solution, a gas capable of dissolving sulfur, but unsaturated with sulfur, in such a quantity that the temperature at which the sulfur will precipitate is reduced to below the melting temperature of sulfur and above said temperature at which said gases reach the upper ends of said pipes, so that only crystalline sulfur will precipitate from the rising gases; separating said gases reaching the upper ends of said pipes, from crystalline sulfur precipitated from the same; and introducing at least a portion of the thus separated gases as said gas capable of dissolving sulfur but unsaturated with sulfur into subsequent portions of said rising gases.

References Cited by the Examiner

UNITED STATES PATENTS

| | | | |
|---|---|---|---|
| 119,884 | 10/1871 | Roberts | 166—41 X |
| 2,110,905 | 3/1938 | Chase | 137—13 |
| 2,643,161 | 6/1953 | Shirk | 302—66 |
| 2,798,772 | 7/1957 | Redcay. | |
| 2,809,698 | 10/1957 | Bond et al. | 166—44 X |

OTHER REFERENCES

Kennedy, H. T. and Wieland, D. R.: Equilibrium in the Methane-Carbon Dioxide-Hydrogen Sulfide-Sulfur System, in Jour. Pet. Technology, July 1960, pp. 166–169, TN 860. J6.

CHARLES E. O'CONNELL, *Primary Examiner.*

BENJAMIN HERSH, *Examiner.*